(12) United States Patent
Yang et al.

(10) Patent No.: US 10,970,884 B1
(45) Date of Patent: Apr. 6, 2021

(54) SYSTEMS AND METHODS FOR PROVIDING CONTENT

(71) Applicant: Facebook, Inc., Menlo Park, CA (US)

(72) Inventors: Hongji Yang, Belmont, CA (US); Yuji Wang, Sunnyvale, CA (US); Yuan Liang, Fremont, CA (US); Dan Zhang, Foster City, CA (US); Ren Lu, Mountain View, CA (US); Amber Muck, Emeryville, CA (US); Ethan Lubka, San Mateo, CA (US); Yi-Wei Wu, Mountain View, CA (US); Lingfei He, Menlo Park, CA (US); Yin Kam Hung, Newark, CA (US); Michael Thomas Gofron, New York City, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/299,030

(22) Filed: Mar. 11, 2019

Related U.S. Application Data

(60) Provisional application No. 62/806,334, filed on Feb. 15, 2019.

(51) Int. Cl.
    *G06T 11/00*      (2006.01)
    *G06K 9/46*      (2006.01)
    *G06T 11/40*      (2006.01)

(52) U.S. Cl.
    CPC .......... *G06T 11/001* (2013.01); *G06K 9/4647* (2013.01); *G06T 11/40* (2013.01)

(58) Field of Classification Search
    CPC ..................................................... G06T 11/001
    USPC ......................................................... 345/586
    See application file for complete search history.

(56) References Cited

U.S. PATENT DOCUMENTS

| | | | |
|---|---|---|---|
| 8,811,740 B1 * | 8/2014 | Brendel .................. | G06T 5/007 382/167 |
| 2012/0027294 A1 * | 2/2012 | Krolczyk ................ | G06T 11/60 382/165 |

* cited by examiner

*Primary Examiner* — Shivang I Patel
(74) *Attorney, Agent, or Firm* — Sheppard Mullin Richter & Hampton LLP

(57) ABSTRACT

Systems, methods, and non-transitory computer-readable media can obtain a media item. The media item is positioned in a content item. A plurality of histograms are generated based on colors of a first portion and a second portion of the media item. A custom background for the media item in the content item is generated based on the plurality of histograms.

20 Claims, 8 Drawing Sheets

US 10,970,884 B1

SYSTEMS AND METHODS FOR PROVIDING CONTENT

CROSS-REFERENCE TO RELATED APPLICATIONS

This application claims priority to U.S. Provisional Patent Application No. 62/806,334, filed on Feb. 15, 2019 and entitled "SYSTEMS AND METHODS FOR PROVIDING CONTENT", which is incorporated in its entirety herein by reference.

FIELD OF THE INVENTION

The present technology relates to the field of content provision. More particularly, the present technology relates to computerized techniques for presenting content.

BACKGROUND

Today, people often utilize computing devices (or systems) for a wide variety of purposes. Users can use their computing devices to, for example, interact with one another, access content, share content, and create content. In some cases, content items can include postings from users or third party entities (e.g., businesses, organizations, etc.) participating in a social network. The postings may include text and media content items, such as images, graphical interchange formats (GIFs), videos, and audio. In some cases, the postings may also include advertising content items. The postings may be published to the social network for consumption by others.

SUMMARY

Various embodiments of the present technology can include systems, methods, and non-transitory computer readable media configured to obtain a media item. The media item is positioned in a content item. A plurality of histograms are generated based on colors of a first portion and a second portion of the media item. A custom background for the media item in the content item is generated based on the plurality of histograms.

In some embodiments, positioning the media item in the content item comprises positioning the media item in the content item such that spatial distances from a top edge of the content item to a top edge of the media item and from a bottom edge of the media item to a bottom edge of the content item are the same.

In some embodiments, generating the plurality of histograms based on the colors of the first portion and the second portion of the media item comprises: sampling the colors from a top portion and a bottom portion of the media item based on pixels; quantizing the sampled colors into a discrete number of colors; and generating a first histogram and a second histogram based on the discrete number of colors corresponding to the top portion and the bottom portion, respectively, of the media item.

In some embodiments, generating the custom background for the media item based on the plurality of histogram comprises: identifying a first color from a first histogram that has a highest color frequency; identifying a second color from a second histogram that a highest color frequency; and generating the custom background for the media item based on the first color and the second color, wherein the first color is used to fill a spacing between a top edge of the content item to a top edge of the media item and the second color is used to fill a spacing between a bottom edge of the media item to a bottom edge of the content item.

In some embodiments, generating the custom background for the content item based on the plurality of histogram comprises: identifying a first color from a first histogram that has a highest color frequency; identifying a second color from a second histogram that a highest color frequency; and generating a color gradient based on the first color and the second color, wherein the color gradient is used to fill spacing from a top edge of the content item to a top edge of the media item and from a bottom edge of the media item to a bottom edge of the content item.

In some embodiments, a plurality of colors for a caption background are determined. A plurality of color combinations for a caption are generated. A color combination for the caption from the plurality of color combinations that has a highest contrast ratio is identified.

In some embodiments, determining the plurality of colors for the caption background comprises: identifying a first set of colors based on the plurality of histograms; and determining a second set of colors based on the colors of the first set.

In some embodiments, determining the second set of colors based on the colors of the first set comprises: adding a value to a value component of HSV corresponding to a first color of the first set; and subtracting a value from a value component of HSV corresponding to a second color of the first set.

In some embodiments, the plurality of color combinations for the caption includes color combinations of the plurality of colors for the caption background and black or white caption text.

In some embodiments, the highest contrast ratio is determined using the formula: Contrast Ratio=$(L1+0.05)/(L2+0.05)$.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
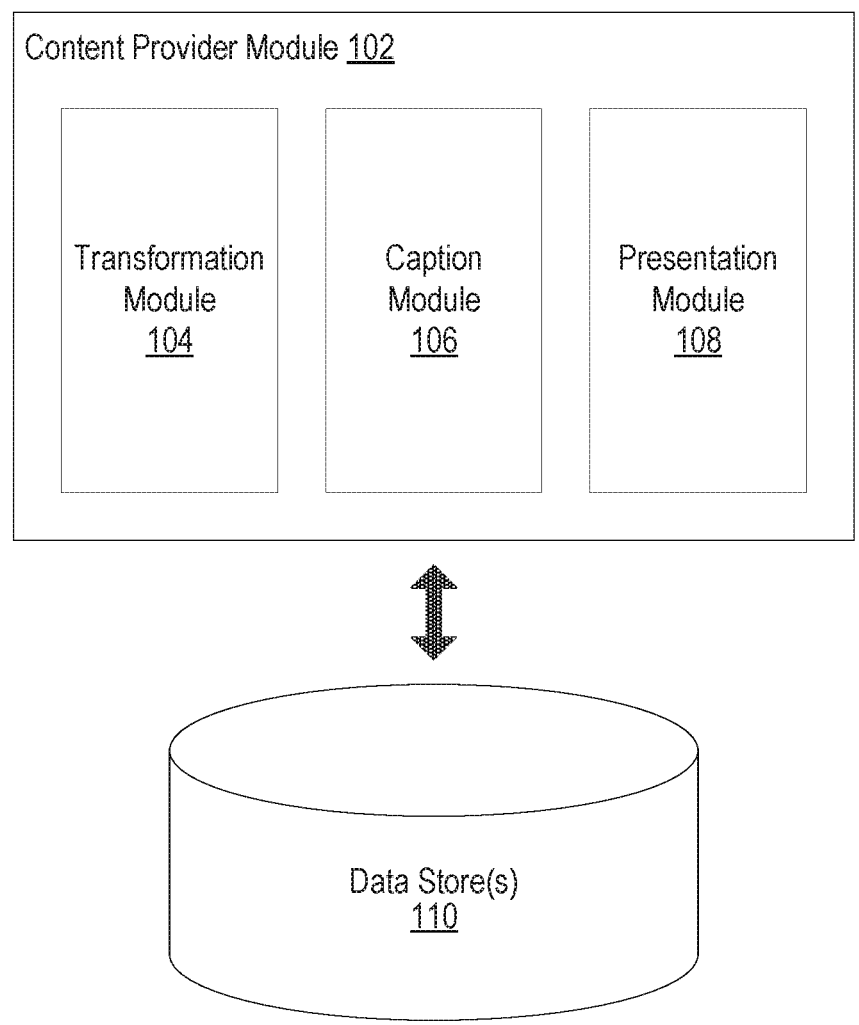
FIG. 1 illustrates an example system, including an example content provider module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People often utilize computing devices (or systems) for a wide variety of purposes. Users can use their computing devices to, for example, interact with one another, access content, share content, and create content. In some cases, content items can include postings from users or third party entities (e.g., businesses, organizations, etc.) participating in a social network. The postings may include text and media content items, such as images, graphical interchange formats (GIFs), videos, and audio. In some cases, the postings may also include advertising content items. The postings may be published to the social network for consumption by others.

In general, a content provider (e.g., a social networking system) can provide users with access to various content items. In some instances, the content provider can provide content items to users within their content feeds. Further, content items included in a content feed may be formatted based on platform-specific design guidelines (e.g., a pre-defined color theme, horizontal layout orientation, stylized text, etc.). In some instances, such content feeds can include third-party content. For example, third-party content can be generated by third-party entities and subsequently published through the content provider. Like other content items, third-party content published through the content provider can also be formatted based on platform-specific design guidelines. For example, a third-party content item can be originally formatted to conform to platform-specific design guidelines associated with a content provider. In some instances, it may be desirable to re-publish the content item through a different content provider (or a different content feed). The different content provider may have its own platform-specific design guidelines. Conventional approaches generally do not provide an ability to convert content that was originally formatted for a first content provider to be re-formatted for publication through a different, second content provider. For example, a content item that is formatted for a first content provider may have a horizontal orientation based on design guidelines associated with the first content provider. A second content provider may be associated with different design guidelines that require content items to have a vertical orientation. In this example, publishing the content item through the second content provider would result in suboptimal appearance of the horizontally-oriented content item because the horizontally-oriented content item has an incorrect orientation for the second content provider. Accordingly, conventional approaches may not be effective in addressing these and other problems arising in computer technology.

An improved approach rooted in computer technology overcomes the foregoing and other disadvantages associated with conventional approaches specifically arising in the realm of computer technology. In various embodiments, the disclosed technology can transform a content item (e.g., an advertisement) for display in a content feed of a content provider, such as a social networking system. For example, a horizontal-oriented content item can be transformed for display in a vertical-oriented content feed. The disclosed technology can obtain a content item from a third party entity. In some cases, the content item can be a content item that was previously formatted for or published on another platform. The content item can be placed in the content feed to be presented to users. In some embodiments, the content item can comprise a media item, such as a video, image, or GIF, in conjunction with a caption and/or a call-to-action element. The placement of the media item in the content item can be dynamically adjusted based on whether, for example, a caption or a call-to-action element is present. For example, the positions of a media item and an associated caption in the content item can be determined so that they are symmetrically positioned in a space or area of a content feed in which the content item is to be presented. In some embodiments, the disclosed technology can selectively fill spacing adjacent to the media item, the caption, and/or the call-to-action element with colors that are similar to the media item. Furthermore, in some embodiments, the disclosed technology can generate a caption background that provides optimal contrast (e.g., a high contrast ratio) to caption text. Once the content item is transformed, the disclosed technology can use one or more machine learning models to determine a likelihood or probability that users of the social networking system will interact with the transformed content item. More details regarding the disclosed technology are provided below.

FIG. 1 illustrates an example system 100, including an example content provider module 102, according to an embodiment of the present technology. In some embodiments, the content provider module 102 can be implemented as part of a social networking system. As shown in the example of FIG. 1, the content provider module 102 can include a transformation module 104, a caption module 106, and a presentation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. The content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content provider module 102 can be configured to communicate and/or operate with the at least one data store 110, as shown in the example system 100. The at least one data store 110 can be configured to store and maintain various types of data. For example, the at least one data store 110 can store information describing various content that has been viewed, accessed, consumed, modified, or created by user or third party entities of the social networking system. In some implementations, the at least one data store 110 can store information associated with the social networking system (e.g., the social networking system 630 of FIG. 6). The information associated with the social networking system can include data about users, third party entities, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users or third party entities, such as user or third party entity identifiers, user or third party entity information, profile information, user or third party entity specified settings, content produced or posted by users or third party entities, and various other types of user or third party entity data.

The transformation module 104 can be configured to transform a content item to conform to a format associated with a content feed. In some embodiments, the content feed can present content items in a particular (e.g., portrait or vertical) orientation. In various embodiments, the transformation module 104 can transform a content item that was previously formatted in a first (e.g., landscape or horizontal) orientation to have a second (e.g., portrait or vertical) orientation. In various embodiments, the transformation module 104 can obtain a content item from a third party entity. For example, a third party entity can upload or submit a content item that is processed by the transformation module 104. The content item can be any type of content item including, for example, an advertisement. In an embodiment, the content item may comprise a media item such as a video, image, GIF, etc. In this embodiment, the transformation module 104 can symmetrically position the media item into a space or area in which the content item is to be presented in a content feed. In some embodiments, in addition to the media item, the content item may also include other associated elements, such as a caption and/or a call-to-action element. In such embodiments, the transformation module 104 can transform the media item, the caption, and/or the call-to-action element into templates such that spacing adjacent to the media item, the caption, and the call-to-action element can result in symmetrical positioning of the media item, the caption, and the call-to-action element in accordance with the design of a particular template. In some embodiments, the transformation module 104 can identify predominant colors of the media item based on colors in a first (e.g., top) portion and a second (e.g., bottom) portion of the media item. The transformation module 104 can selectively fill the spacing that results from placement of the media item in a content item with the predominant colors. The transformation module 104 will be discussed in greater detail with respect to FIG. 2.

The caption module 106 can be configured to determine an optimal contrast ratio for a caption associated with a media item. In some embodiments, a content item can have a caption that describes products, concepts, ideas, people, or entities depicted in the media item. The caption can be displayed alongside the media item in the content item. In such embodiments, the caption module 106 can provide a caption background for the caption such that caption text can be easily viewable to users. The caption module 106 can determine a color for the caption background such that the caption text is optimally shown to users viewing the caption. The caption module 106 will be discussed in greater detail with respect to FIG. 3.

The presentation module 108 can be configured to present a transformed content item (e.g., a content item that has been transformed by the transformation module 104) for display to users in a content feed. In various embodiments, the presentation module 108 can interact with the transformation module 104 and the caption module 106 to determine whether to present the transformed content item to users. For example, once a content item (e.g., a media item, a caption, and/or a call-to-action element) is transformed by the transformation module 104 and a caption background is added to the content item by the caption module 106, the presentation module 108 can evaluate the transformed content item to determine a probability that users will interact with the transformed content item and to decide whether to present the transformed content item to the users based on the probability. In some embodiments, the presentation module 108 can use various machine learning techniques to determine whether a transformed content item is sufficiently relevant or of interest to a user to warrant presentation to the user. Under such embodiments, one or more features can be extracted from a transformed content item. The one or more features can include colors, graphics (e.g., products, animals, babies, etc.), caption lengths (e.g., caption word count), contrast ratio of captions, and the like. The presentation module 108 can provide the one or more features to a machine learning model that has been trained to determine a score that represents relevancy of transformed content items to users. If the score of the transformed content item satisfies (e.g., equals or exceeds) a threshold value, the transformed content item can be shown to users in their content feeds. If the score does not satisfy the threshold value, the transformed content item is not shown to users. In some embodiments, machine learning models can be trained based on various additional features, such as user color preferences, content layout preferences, content item metadata, user browsing behavior, and other information. In some embodiments, the presentation module 108 can use a plurality of machine learning models. As just one example, a first machine learning model can determine color preferences of users. a second machine learning model can determine optimal content layout for users, and so forth. In some embodiments, outputs of the plurality of the machine learning models can be aggregated or combined to generate a score, which when compared to a threshold value, can determine whether a transformed content item is shown to a user. Many variations are possible.

Figure 2:
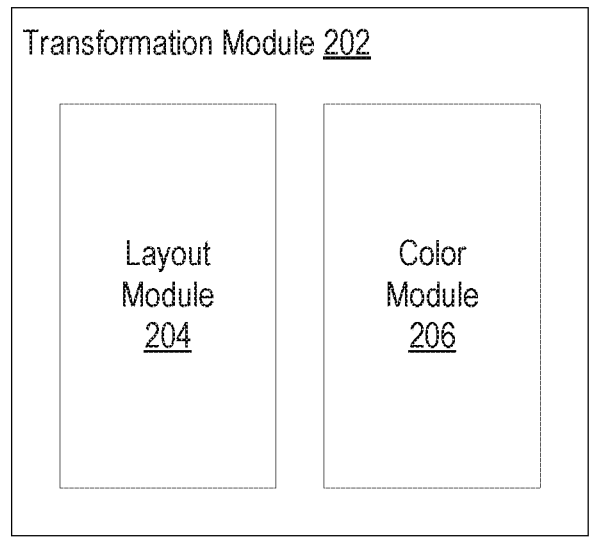
FIG. 2 illustrates an example transformation module, according to an embodiment of the present technology.

FIG. 2 Illustrates an example transformation module 202, according to an embodiment of the present technology. In some embodiments, the transformation module 104 of FIG. 1 can be implemented as the transformation module 202. As discussed, the transformation module 202 can transform a content item to conform to design guidelines of a content provider or a format for content items associated with a content feed. The transformation module 202 can also "extend" colors of a media item of the content item to fill the spaces (e.g., letterboxing) within the content layout. As a result, the transformed content item is more visually appealing. As shown in FIG. 2, the transformation module 202 can include a layout module 204 and a color module 206.

The layout module 204 can be configured to dynamically transform contents of a content item (e.g., a media item, a caption, and/or a call-to-action element) for presentation in a content feed (e.g., a story feed). In some embodiments, the content feed can present content items to users in a portrait orientation. For example, a user can access content items in the content feed on a display of a computing device operated by the user. The display can have a portrait orientation. In various embodiments, the layout module 204 can obtain a media item associated with a content item, such as an image, video, etc. In some instances, the media item can be created by a third party entity. In some cases, the media item may be a media item that was previously published on another platform (e.g., a website, another social networking system, etc.) or another type of feed (e.g., a news feed). Once obtained, the layout module 204 can place the media item in the space or area in which the content item is to be presented such that spacing adjacent to the media item is symmetrical. For example, in some embodiments, the media item can be an image in a landscape orientation. In this example, the image can be positioned in the content item such that spacing from a top edge of the image to an adjacent (e.g., top) edge of the content item and spacing from a bottom edge of the image to an adjacent (e.g., bottom) edge of the content item have the same spatial or pixel distance. In some embodiments, the content item can include a caption. In such embodiments, the layout module 204 can place the caption below the media item in the content item. Moreover, the layout module 204 can position the media item and the caption such that spacing between the media item and the caption relative to each other and to the boundaries of the content item result in symmetrical positioning of the media item and the caption in the content item. For example, spacing from the top edge of the content item to the top edge of the media item, spacing from the bottom edge of the media item to a top of the caption, and spacing from a bottom of the caption to the bottom edge of the content item can have the same spatial or pixel distances. In some embodiments, the content item can further include a call-to-action element. The call-to-action element, when present in the content item, allows users to further interact with the content item. For example, once a user views the content item and if the user wants to learn more about, for example, product(s) depicted or described in the content item, the user may click, touch, or otherwise interact with the call-to-action element to access further information related to the product(s). In some embodiments, the layout module 204 can place the call-to-action element below the caption in the content item. In some embodiments, the layout module 204 can arrange the media item, the caption, and the call-to-action element such that they are symmetrically positioned in the content item. For example, spacing from the top edge of the content item to the top edge of the media item, spacing from the bottom edge of the media item to the top of the caption, spacing from the bottom of the caption to a top of the call-to-action element can have the same spatial or pixel distances. In some embodiments, a bottom of the call-to-action element can approximately or substantially coincide with the bottom edge of the content item, and therefore there is no spacing between the call to action element and the bottom edge of the content item. Many variations are possible.

The color module 206 can be configured to generate a custom background for a content item. In various embodiments, the color module 206 can generate a custom background based on colors of a media item of the content item. The color module 206 can sample or extract colors from a top portion and a bottom portion of the media item pixel by pixel. In some embodiments, the top portion and the bottom portion of the media item can be defined as having an X number of pixel rows and Y number of pixel columns. The sampled or extracted colors of each portion can be quantized into a discrete number of colors. For example, a top portion of a media item (e.g., an image) can depict a blue sky with some clouds and with variations in color shades. In this example, the color module 206 can quantize colors in the top portion of the image into two discrete colors: light blue (e.g., color of the blue sky) and white (e.g., color of the clouds). In other words, the color module 206 can group or map various colors into a number of (e.g., single) discrete color(s). In general, the number of discrete colors available can vary depending on color models used. For example, in one implementation, a number of discrete colors available can be determined based on a mixture of base colors comprising red, green, and blue (e.g., a RGB color model). In another implementation, number of discrete colors available can be determined based on a mixture of base colors comprising cyan, magenta, yellow, and black (e.g., a CMYK color model). Once the number of discrete colors has been determined, the color module 206 can sample colors in the media item, pixel by pixel, and create a histogram corresponding to the quantized colors of the media item. In some embodiments, the color module 206 can create two histograms. A first histogram can correspond to quantized colors of the top portion of the media item and a second histogram can correspond to quantized colors of the bottom portion of the media item. The color module 206 then selects a first color with the highest frequency in the first histogram (e.g., a color that is most dominant in the top portion of the media item) and a second color with the highest frequency in the second histogram (e.g., a color that is most dominant in the bottom portion of the media item) as colors of the custom background. For example, a top portion of an image can have a color distribution that is predominately magenta and a bottom portion of the image can have a color distribution that is predominantly yellow. In this example, a histogram corresponding to the top portion of the image has magenta as its highest occurring color (highest frequency), and a histogram corresponding to the bottom portion of the image has yellow as its highest occurring color (highest frequency). Thus, in this example, magenta and yellow can be colors of a custom background corresponding to the image. In general, the color module 206 can use the first color to fill the spacing between the top edge of the content item to the top edge of the media item. Similarly, the color module 206 can use the second color to fill the spacing between the bottom edge of the content item to the bottom edge of the media item.

In some embodiments, the color module 206 can generate a color gradient based on colors selected from the histograms. In such embodiments, instead of having a single discrete color that fills the spacing adjacent to the media item, a color gradient fills the spacing. For example, the color module 206 can determine that, for a media item of a content item, a black color and a white color are most representative colors corresponding to a top portion and a bottom portion, respectively, of the media item. In this example, the color module 206, based on the black color and the white color, can create a color gradient such that color changes from the black color to the white color along a vertical direction of the content item in which the media item is positioned. In this custom background, color transitions from black to white through shades of gray. This color gradient can then be utilized by the transformation module 202 to fills the spacing adjacent to the media item in the content item.

Figure 3:
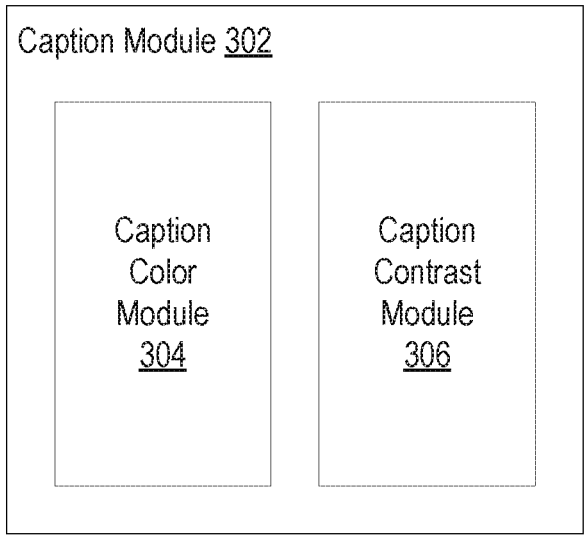
FIG. 3 illustrates an example caption module, according to an embodiment of the present technology.

FIG. 3 Illustrates an example caption module 302, according to an embodiment of the present technology. In some embodiments, the caption module 106 of FIG. 1 can be implemented as the caption module 302. As discussed, the caption module 302 determine an optimal contrast for a caption associated with a content item. The caption module 302 can create a caption background that provides an optimal contrast with caption text. As shown in FIG. 3, the caption module 302 can include a caption color module 304 and a caption contrast module 306.

The caption color module 304 can be configured to generate a color for a caption background. In various embodiments, for a media item of a content item, the caption color module 304 can generate various possible caption text-caption background combinations. The possible caption text-caption background combinations can be determined based on various combinations of color sets corresponding to the media item. For example, a first color set can comprise two colors of a custom background generated by the transformation module 202. A second color set can comprise two colors that are modified from the two colors of the custom background. A third color set is black and white colors of caption text. As discussed, for the first color set, the two colors are determined by the transformation module 202 based on histograms associated with a top portion and a bottom portion of the given media item. For the second color set, the two colors are determined based on adjusting hue-saturation-value (HSV) values of the two colors of the first color set. In general, a color to be presented on a computing system can be represented by an HSV value. The HSV value has three components: hue, saturation, and value. A hue component generally refers to colors in a color model (e.g., RGB model). A saturation component generally refers to shade or intensity of the colors in the color model. A value component generally refers to "lightness" or "darkness" of the colors in the color model. With respect to the second color set, a first color in the second color set can be determined by adding a selected number (i.e., becoming lighter) to the value component of the HSV corresponding to the color representing the top portion of the media item. As just one example, the selected number can be 0.2. A second color in the second color set can be determined by subtracting a selected number (i.e., becoming darker) from the value component of the HSV corresponding to the color representing to the bottom portion of the given media item. As just one example, the selected number can be 0.2. In general, the value of any component in the HSV value associated with a color can be adjusted. Further, the value of any component can by adjusted by any amount or different amounts, not merely 0.2, which is discussed only as an example. Continuing with the example above, the colors from the first color set and the colors from the second color set are options that form a basis for colors of the caption background. These color options can then be contrasted with either black or white caption text.

The caption contrast module 306 can be configured to select a caption text-caption background combination out of the possible combinations that provides an optimal contrast ratio (or highest contrast ratio). In some embodiments, the caption contrast module 306 can use an algorithm to determine a contrast ratio for each caption text-caption background combination as follows:

$$\text{Contrast Ratio} = (L1+0.05)/(L2+0.05)$$

where L1 is relative color luminance of caption background and L2 is relative color luminance of caption text. Based on this algorithm, the caption contrast module 306 can compute a contrast ratio for all possible caption text-caption background combinations. The caption contrast module 306 then can select a caption text-caption background combination out of the possible combinations that has the largest contrast ratio value. In some instances, white caption text can be preferred by users over black caption text. Thus, in those instances, any combination of caption background with white caption text having a contrast ratio that exceeds a threshold contrast ratio will be selected over a combination of caption background with black caption text even if a contrast value of the combination of caption background with black caption text is higher than the contrast ratio of the combination of caption background with white caption text. Many variations are possible.

Figure 4A:
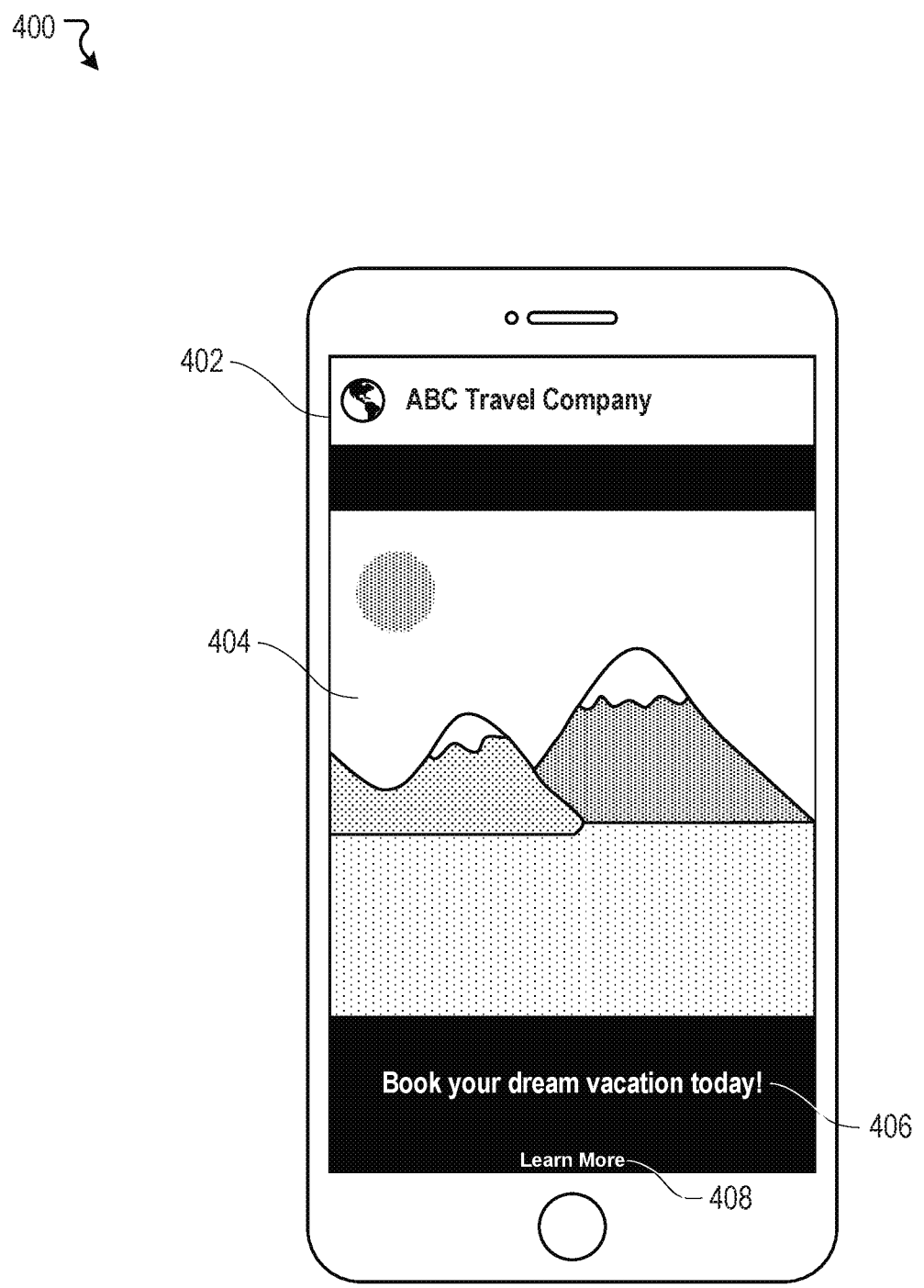
FIG. 4A illustrates an example diagram, according to an embodiment of the present technology.

FIG. 4A illustrates an example diagram 400, according to an embodiment of the present technology. This example diagram 400 depicts a scenario supported by the content provider module 102 in which a media item 404 is included in a content item 402 displayed in a content feed presented through a computing device of a user. Further depicted in this example diagram 400 is a caption 406 and a call-to-action element 408 associated with the media item 404. In this example, the media item 404 has a different aspect ratio than content items formatted for the content feed. As a result, when the media item 404 is placed into the content item 402 for the content feed, the media item 404 is letterboxed (e.g., having black bars above and below the media item 404). In this example, the media item 404 is positioned in the content item 402 such that spacing between the media item 404 and the caption 406 and spacing between the caption 406 and the call-to-action element 408 within the content item 402 have the same spatial or pixel distances. In other instances (not shown), spacing between various elements of the content item 402 (e.g., top edge of the content item 402, the media item 404, the caption 406, the call-to-action element 408, bottom edge of the content item 402) can have the same spatial or pixel distances. Many variations are possible.

Figure 4B:
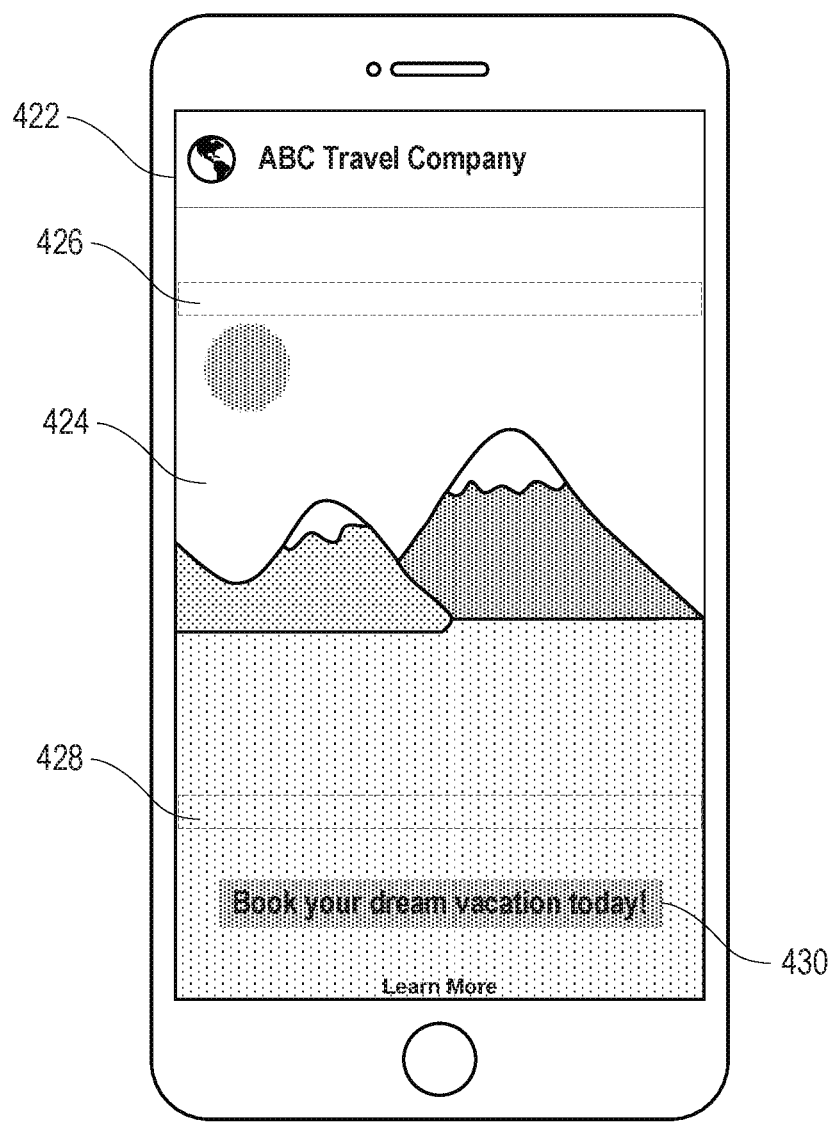
FIG. 4B illustrates another example diagram, according to an embodiment of the present technology.

FIG. 4B illustrates another example diagram 420, according to an embodiment of the present technology. This example diagram 420 depicts a scenario supported by the content provider module 102 in which a media item 424 in a content item 422, the same media item as the media item 404 of FIG. 4A, has been transformed by the disclosed technology to remove letterboxing. The transformed content item 422 is displayed in a content feed presented through a computing device of a user. Here, the disclosed technology can sample a top portion 426 and a bottom portion 428 of the media item 424. The disclosed technology can quantized colors in the top portion 426 and the bottom portion 428, create histograms based on the quantized colors, and select colors in the histogram that are most representative of the top portion 426 and the bottom portion 428. The disclosed technology can fill spacing between the media item 424 and a top edge of the content item 422 and spacing between the media item 424 and a bottom edge of the content item 422 with the two selected colors. Further, in this example diagram 420, a caption 430 is depicted. The caption 430 is shown with a caption background and caption text has been determined by the disclosed technology to have an optimal contrast ratio.

Figure 5:
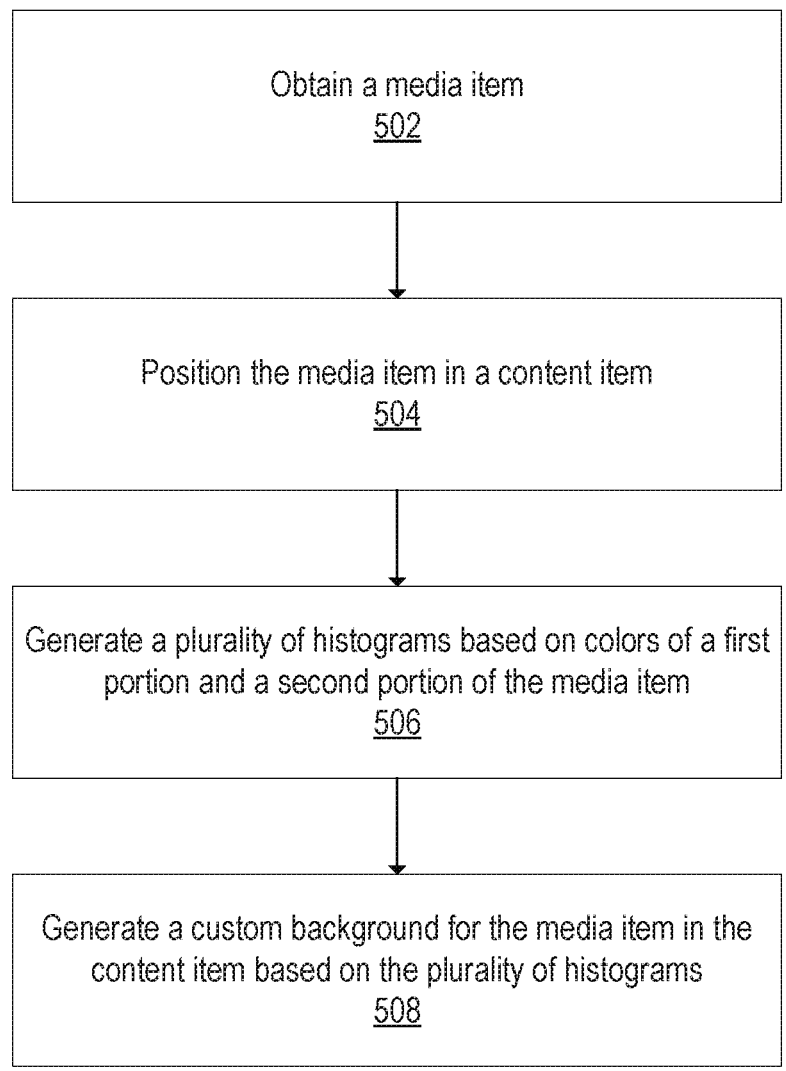
FIG. 5 illustrates an example method, according to an embodiment of the present technology.

FIG. 5 illustrates an example method, according to an embodiment of the present technology. It should be appreciated that there can be additional, fewer, or alternative steps performed in similar or alternative orders, or in parallel, within the scope of the various embodiments discussed herein unless otherwise stated.

At block 502, a media item can be obtained. At block 504, the media item can be positioned in a content item. At block 506, a plurality of histograms can be generated based on colors of a first portion and a second portion of the media item. At block 508, a custom background for the media item in the content item can be generated based on the plurality of histograms.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
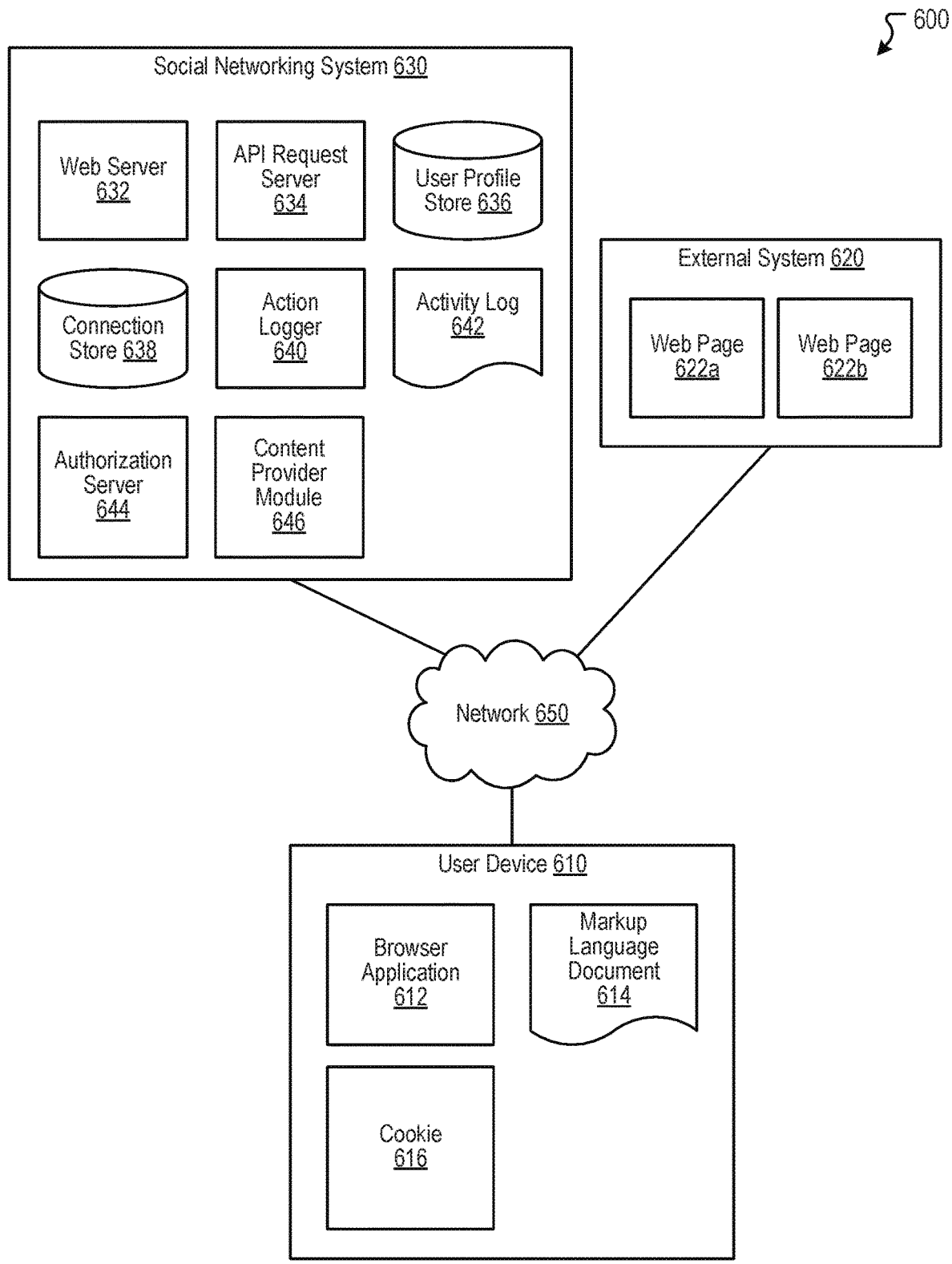
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and media content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can be implemented with the content provider module 102 of FIG. 1. In some embodiments, one or more functionalities of the content provider module 646 can also be implemented in the user device 610.

Hardware Implementation

Figure 7:
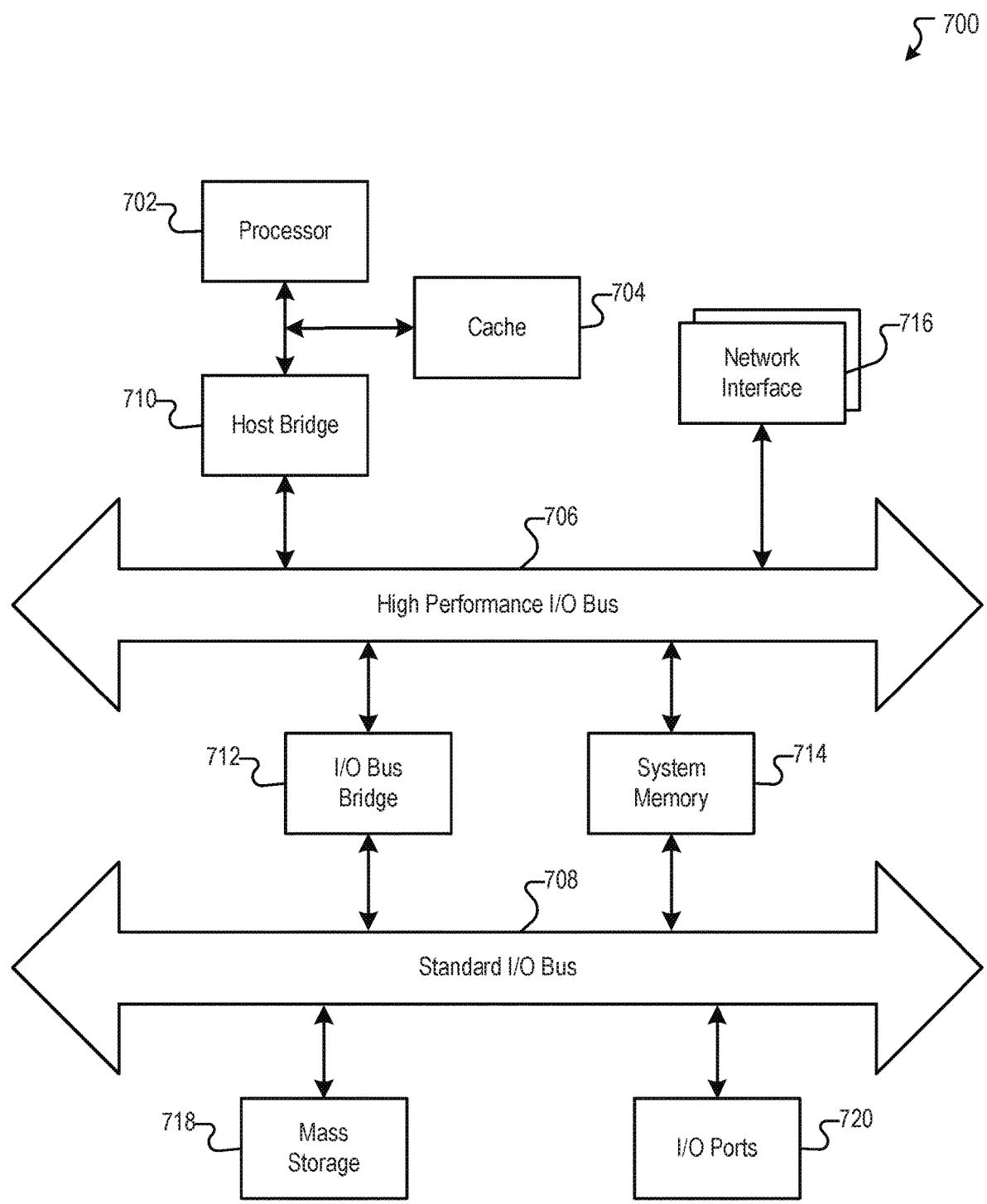
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a media item;
   generating, by the computing system, a plurality of histograms based on colors of a first portion and a second portion of the media item, the generating further comprising:
      sampling, by the computing system, colors included in the first portion of the media item, wherein the first portion corresponds to pixels associated with a top portion of the media item;
      generating, by the computing system, a first histogram based on colors sampled from the first portion of the media item;
      sampling, by the computing system, colors included in the second portion of the media item, wherein the second portion corresponds to pixels associated with a bottom portion of the media item; and
      generating, by the computing system, a second histogram based on colors sampled from the second portion of the media item; and
   generating, by the computing system, a custom background for the media item in a content item based on the first histogram and the second histogram.

2. The computer-implemented method of claim 1, further comprising:
   positioning, by the computing system, the media item in the content item such that spatial distances from a top edge of the content item to a top edge of the media item and from a bottom edge of the media item to a bottom edge of the content item are the same.

3. The computer-implemented method of claim 1, wherein generating the plurality of histograms based on the colors of the first portion and the second portion of the media item comprises:
   quantizing, by the computing system, the sampled colors into a discrete number of colors.

4. The computer-implemented method of claim 1, wherein generating the custom background for the media item based on the plurality of histogram comprises:
   identifying, by the computing system, a first color from the first histogram that has a highest color frequency;
   identifying, by the computing system, a second color from the second histogram that a highest color frequency; and
   generating, by the computing system, the custom background for the media item based on the first color and the second color, wherein the first color is used to fill a spacing between a top edge of the content item to a top edge of the media item and the second color is used to fill a spacing between a bottom edge of the media item to a bottom edge of the content item.

5. The computer-implemented method of claim 1, wherein generating the custom background for the content item based on the plurality of histogram comprises:
   identifying, by the computing system, a first color from the first histogram that has a highest color frequency;
   identifying, by the computing system, a second color from the second histogram that a highest color frequency; and
   generating, by the computing system, a color gradient based on the first color and the second color, wherein the color gradient is used to fill spacing from a top edge of the content item to a top edge of the media item and from a bottom edge of the media item to a bottom edge of the content item.

6. The computer-implemented method of claim 1, further comprising:
   determining, by the computing system, a plurality of colors for a caption background;
   generating, by the computing system, a plurality of color combinations for a caption based on the plurality of colors for the caption background; and
   identifying, by the computing system, a color combination for the caption from the plurality of color combinations that has a highest contrast ratio.

7. The computer-implemented method of claim 6, wherein determining the plurality of colors for the caption background comprises:
   identifying, by the computing system, a first set of colors based on the plurality of histograms; and
   determining, by the computing system, a second set of colors based on the colors of the first set.

8. The computer-implemented method of claim 7, wherein determining the second set of colors based on the colors of the first set comprises:
   adding, by the computing system, a value to a value component of hue-saturation-value (HSV) corresponding to a first color of the first set; and
   subtracting, by the computing system, a value from a value component of HSV corresponding to a second color of the first set.

9. The computer-implemented method of claim 6, wherein the plurality of color combinations for the caption includes color combinations of the plurality of colors for the caption background and black or white caption text.

10. The computer-implemented method of claim 6, wherein the highest contrast ratio is determined using the formula: Contrast Ratio=(L1+0.05)/(L2+0.05).

11. A computing system comprising:
    at least one processor; and a memory storing instructions that, when executed by the at least one processor, cause the computing system to perform:

obtaining a media item;

generating a plurality of histograms based on colors of a first portion and a second portion of the media item, the generating further comprising:

sampling colors included in the first portion of the media item, wherein the first portion corresponds to pixels associated with a top portion of the media item;

generating a first histogram based on colors sampled from the first portion of the media item;

sampling colors included in the second portion of the media item, wherein the second portion corresponds to pixels associated with a bottom portion of the media item; and generating a second histogram based on colors sampled from the second portion of the media item; and generating a custom background for the media item in a content item based on the first histogram and the second histogram.

12. The computing system of claim 11, wherein the instructions further cause the computing system to perform:

positioning the media item in the content item such that spatial distances from a top edge of the content item to a top edge of the media item and from a bottom edge of the media item to a bottom edge of the content item are the same.

13. The computing system of claim 11, wherein generating the plurality of histograms based on the colors of the first portion and the second portion of the media item comprises:

quantizing the sampled colors into a discrete number of colors.

14. The computing system of claim 11, wherein generating the custom background for the media item based on the plurality of histogram comprises:

identifying a first color from the first histogram that has a highest color frequency;

identifying a second color from the second histogram that a highest color frequency; and generating the custom background for the media item based on the first color and the second color, wherein the first color is used to fill a spacing between a top edge of the content item to a top edge of the media item and the second color is used to fill a spacing between a bottom edge of the media item to a bottom edge of the content item.

15. The computing system of claim 11, wherein generating the custom background for the content item based on the plurality of histogram comprises:

identifying a first color from the first histogram that has a highest color frequency;

identifying a second color from the second histogram that a highest color frequency; and generating a color gradient based on the first color and the second color, wherein the color gradient is used to fill spacing from a top edge of the content item to a top edge of the media item and from a bottom edge of the media item to a bottom edge of the content item.

16. A non-transitory computer-readable storage medium including instructions that, when executed by at least one processor of a computing system, cause the computing system to perform a method comprising:

obtaining a media item;

generating a plurality of histograms based on colors of a first portion and a second portion of the media item, the generating further comprising:

sampling colors included in the first portion of the media item, wherein the first portion corresponds to pixels associated with a top portion of the media item;

generating a first histogram based on colors sampled from the first portion of the media item;

sampling colors included in the second portion of the media item, wherein the second portion corresponds to pixels associated with a bottom portion of the media item; and generating a second histogram based on colors sampled from the second portion of the media item; and generating a custom background for the media item in a content item based on the first histogram and the second histogram.

17. The non-transitory computer-readable storage medium of claim 16, wherein the instructions further cause the computing system to perform:

positioning the media item in the content item such that spatial distances from a top edge of the content item to a top edge of the media item and from a bottom edge of the media item to a bottom edge of the content item are the same.

18. The non-transitory computer-readable storage medium of claim 16, wherein generating the plurality of histograms based on the colors of the first portion and the second portion of the media item comprises:

quantizing the sampled colors into a discrete number of colors.

19. The non-transitory computer-readable storage medium of claim 16, wherein generating the custom background for the media item based on the plurality of histogram comprises:

identifying a first color from the first histogram that has a highest color frequency;

identifying a second color from the second histogram that a highest color frequency; and generating the custom background for the media item based on the first color and the second color, wherein the first color is used to fill a spacing between a top edge of the content item to a top edge of the media item and the second color is used to fill a spacing between a bottom edge of the media item to a bottom edge of the content item.

20. The non-transitory computer-readable storage medium of claim 16, wherein generating the custom background for the content item based on the plurality of histogram comprises:

identifying a first color from the first histogram that has a highest color frequency;

identifying a second color from the second histogram that a highest color frequency; and generating a color gradient based on the first color and the second color, wherein the color gradient is used to fill spacing from a top edge of the content item to a top edge of the media item and from a bottom edge of the media item to a bottom edge of the content item.

* * * * *